United States Patent [19]

Becker et al.

[11] Patent Number: 5,378,664

[45] Date of Patent: Jan. 3, 1995

[54] OPTICAL FIBER AMPLIFIER AND A GLASS THEREFOR

[75] Inventors: Philippe C. Becker, New York, N.Y.; Allan J. Bruce, Westfield, N.J.; David J. DiGiovanni, Montclair, N.J.; Vincent G. Lambrecht, Jr., Millington, N.J.

[73] Assignee: AT&T Corp., Murray Hill, N.J.

[21] Appl. No.: 82,007

[22] Filed: Jun. 24, 1993

[51] Int. Cl.⁶ .............................................. C03C 3/32
[52] U.S. Cl. .......................................... 501/40; 501/37
[58] Field of Search .................................... 501/37, 40

[56] References Cited

U.S. PATENT DOCUMENTS 4,962,995 10/1990 Andrews et al. ............... 501/40 X
5,244,846 9/1993 Onishi et al. ....................... 501/40

FOREIGN PATENT DOCUMENTS 2223319 10/1974 France ........................... C03C 3/30
4333029 11/1992 Japan ............................. C03C 3/32
5-63284 3/1993 Japan .
5-63285 3/1993 Japan .

OTHER PUBLICATIONS

Borisova et al. "Vitrification in Melts of Chalcogenides of Arsenic & The Rare Earth Elements" *Izv. Akad. Nauk SSSR, Neorg. Mater.* 6(2) 1970 (No Month) pp. 334–335.
Heo et al. "Optical Characteristics of Chalcogenide & Heavy Metal Oxide Glasses Doped with Rare Earths" *SPIE Optical Communications,* vol. 1817 1992 (No Month) pp. 134–140.
Izawa, T., and Sudo, S., *Optical Fibers: Materials and Fabrication,* pp. 137–152 (1987) (No Month).
Cervelle, B. D., et al., "Variation, Avec la Composition, des Indices Refraction des Verres de Sulfureo de Lanthan et de Gallium et Indices de Quelques Verres Apparentes," *Mat. Res. Bull.*, 15:159–164 (1980) (No Month).
Shimzu, Makoto, et al., "28.3 dB Gain Pr-Doped Fluoride Fiber Amplifier Module Pumped by 1.017 $\mu m$ InGaAs-LDs," *Proc. OSC/100CR*, PD-12, San Jose, Calif., 1993 (No Month).
Ohishi, Y., et al., "$Pr^{3+}$-doped Fluoride Fiber amplifier operating at 3 $\mu m$," *Optics Letters*, vol. 16, No. 22, pp. 1747–1749, Nov. 15, 1991.
Pedersen, B., et al., "Optimization of $Pr^{3+}$:ZBLAN Fiber Amplifiers," *IEEE Photonics Technology Letters*, 4(5):446 (May 1992).

*Primary Examiner*—Karl Group
*Assistant Examiner*—David Sample
*Attorney, Agent, or Firm*—Richard J. Botos

[57] ABSTRACT

A chalcogenide glass that is doped with praseodymium and contains a rare earth metal is disclosed. The rare earth metal is at least 10 mole percent of the metals in the glass. The concentration of the praseodymium in the glass is at least 200 ppm. The chalcogenide glass, when formed into an amplifier for an optical fiber transmission system, efficiently amplifies optical signals in the signal band of 1.3 $\mu m$.

9 Claims, 1 Drawing Sheet

OPTICAL FIBER AMPLIFIER AND A GLASS THEREFOR

TECHNICAL FIELD

The invention is directed to a rare-earth metal containing glass suitable for use in making optical signal amplifiers for long distance optical transmission systems.

BACKGROUND OF THE INVENTION

Optical fiber transmission systems typically contain electronic repeaters to transmit the optical signal over long distances. Optical fiber amplifiers are emerging as an alternative way in which to amplify optical signals in these transmission systems. The erbium-doped amplifier, for example, amplifies optical signals in transmission systems such as ultra-long distance systems, large capacity CATV systems and optical soliton transmission systems. These systems transmit optical signals that have a wavelength that is within the 1.5 $\mu$m region. Most terrestrial optical fiber transmission systems transmit optical signals in the 1.3 $\mu$m region, however.

Optical fiber amplifiers do not amplify optical signals of every wavelength. The erbium-doped amplifiers described above are not suited for amplifying optical signals in the 1.3 $\mu$m range. Amplifiers are therefore sought for transmission systems that amplify optical signals in the 1.3 $\mu$m region. Praseodymium (Pr) doped fluoride amplifiers (PDFA) have been observed to amplify optical signals in the 1.3 $\mu$m range.

PDFAs, and other optical signal amplifiers, are doped glass materials with certain optical properties. Praseodymium-doped fluorozirconate glass (ZBLAN), for example, has been observed to yield a large gain, about 30 dB, at 1.31 $\mu$m. Shimzu, Makoto, et al., "28.3 dB Gain Pr-Doped Fluoride Fiber Amplifier Module Pumped by 1.017 $\mu$m InGaAs-LDs, "Proc. OSC/I-OOC, PD-12, San Jose, Calif., 1993. The $Pr^{+3}$ is first excited so that a higher energy state is sufficiently populated. The relaxation of the $Pr^{+3}$ from this higher energy state results in the photon emission necessary for the amplification of the 1.3 $\mu$m range optical signal.

The relaxation transition of interest which the $Pr^{+3}$ undergoes is from $^1G_4$ to $^3H_5$. The lifetime of $Pr^{+3}$ in the $^1G_4$ level is short, however. It is reported to be 110 microseconds in ZBLAN, and is limited by non-radiative decay. Ohishi, Y., et al., Optical Letters, 16:1747 (1991). Pedersen, B., et al., "Optimization of $Pr^{3+}$:ZBLAN fiber Amplifiers, " IEEE Photonics Technology Letters, 4(5):446 (May 1992) observe that the small signal gain increases with numerical aperture and pump power when the wavelength of the optical signal to the amplifier is 1310 nm (1.31 $\mu$m). According to Pedersen et al., the pump power needed to get a 30 dB signal gain from the amplifier is 100 to 400 mW, depending on the numerical aperture of the amplifier fiber. These power levels are approximately an order of magnitude higher than the pump power levels for erbium doped amplifiers. These power levels are unacceptably high for some applications because they currently require high power lasers or diode arrays for pumping rather than a single diode. Pedersen et al. represent that the numerical aperture would have to be enlarged to an unacceptable amount in order to reduce the power consumption and still obtain adequate gain. Therefore, a lower power solution to optical amplification in the 1.3 $\mu$m range is sought.

SUMMARY OF THE INVENTION

A rare earth metal-containing chalcogenide glass that is doped with praseodymium is disclosed. "Chalcogenide", for purposes of this invention, means that the glass contains sulfur (S) and other elements. The glass has optical properties which make it useful as an amplifier for optical signals in the 1.3 $\mu$m range.

The rare earth metal in the glass is rare earth metal that does not adversely interfere with the desired excitation or emission of the praseodymium. For example, rare earth metals which do not absorb photons near the pump or emission wavelengths of $Pr^{3+}$ are contemplated is useful in the glass of the present invention. Examples of these rare earth metals include lanthanum, yttrium and lutetium. However, some rare earth metals which do absorb photons near the 1.017 $\mu$m pump wavelength of praseodymium are also contemplated. Ytterbium is one example of such a rare earth metal. The metal in the glass is at least 10 mole percent rare earth metal.

The glass also contains at least one other metal. The other metal promotes glass formation and makes the rare earth metal more soluble in the glass. Suitable metals include the Group 3A metals of the Mendeleevian Periodic Table ("Periodic Table" herein), particularly gallium, indium and aluminum. Of these Group 3A metals, gallium (Ga) is advantageous. The glass optionally contains other metals that further contribute to improving the glass forming ability of the glass mixture. One example of such a metal is germanium (Ge), although other metals that improve the glass forming ability of the glass mixture are contemplated.

The glass is doped with praseodymium ion [$Pr^{3+}$]. The level to which the glass is doped with $Pr^{3+}$ determines, to a certain extent, the optical properties of the glass. For example, if the glass is doped with about 200 ppm to about 2000 ppm of $Pr^{3+}$, based on the total cation content of the glass, the glass will efficiently emit in the 1.3 $\mu$m band.

An optical signal amplifier made of the praseodymium-doped, rare earth metal-containing glass is prepared by forming the glass into a fiber core. The fiber core is surrounded by a cladding. The cladding is optionally made of the rare earth metal-containing glass, but this glass is not doped with $Pr^{3+}$. The cladding is also optionally made of a different glass. If the cladding material is made of the rare earth metal-containing glass, the contents of the glass cladding material are not present in the same amounts as the contents of the glass core material. The difference in the composition of the cladding and the core is required because the glass core must have an index of refraction that is higher than the index of refraction of the cladding. There is typically at least a one percent difference between the index of refraction of the cladding and the index of refraction of the core. This difference in the indexes of refraction of the cladding and the core enables the fiber made of these materials to act as a waveguide and an optical amplifier.

DETAILED DESCRIPTION

Figure 1:
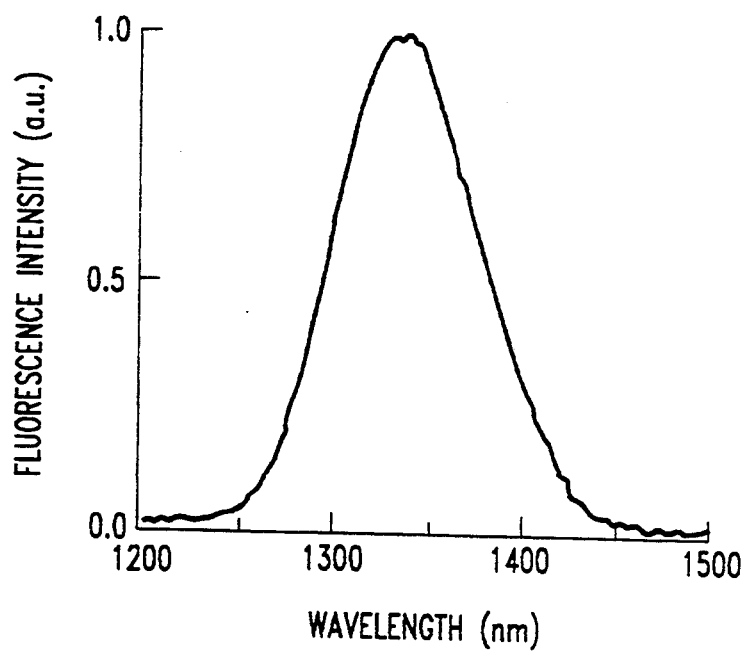
FIG. 1 is a fluorescence spectrum of a praseodymium-doped La—Ga—S glass.

The present invention is directed to a praseodymium doped, rare earth metal-containing chalcogenide glass and optical amplifiers made from this glass. Amplifiers made from this glass amplify optical signals in the 1.3 μm range more efficiently than other known optical amplifiers. The glass contains a combination of metals, including a rare earth metal. The rare earth metal in the chalcogenide glass of the present invention contains a rare earth metal that does not impair the efficiency of the transition of the praseodymium ($Pr^{3+}$) from $^1G_4$ to $^3H_5$ by absorbing or diverting energy that is needed for this transition. Examples of suitable rare earth metals include lanthanum (La), yttrium (Y), and lutetium (Lu). Rare earth metals that absorb energy but do not impair the transition of the $Pr^{3+}$ from $^1G_4$ to $^3H_5$, an example of which is ytterbium (Yb), are also suitable. The rare earth metal is at least about 10 mole percent of the metal in the chalcogenide glass. The metal in the chalcogenide glass is about 10 mole percent to about 50 mole percent rare earth metal.

The rare earth metal-containing chalcogenide glass contains at least one other metal. This second metal promotes glass formation by not permitting significant crystal formation. The second metal also prevents the rare earth metal from separating out of the molten phase during glass formation. For example, this second metal is a metal selected from group 3A of the Periodic Table. Such metals include gallium (Ca), aluminum (Al) and indium (In). Metals other than the Group 3A metals are also contemplated.

The rare earth metal-containing glass optionally contains one or more other metals. These other metals further enhance the stability of the glass by preventing significant crystal formation during the preparation of the glass. Typically, crystal formation adversely affects the optical properties of the glass. Many different metals are contemplated which can be added to the glass for this purpose. Germanium (Ge) is an example of such a metal.

The rare earth metal-containing chalcogenide glass is doped with praseodymium sulfide, which contains praseodymium in the +3 oxidation state ($Pr^{+3}$). The chalcogenide glass is doped with at least about 200 ppm $Pr^{+3}$, based on the cation concentration in the glass, but the $Pr^{+3}$ content of the chalcogenide glass does not exceed about 2000 ppm. If the concentration of the praseodymium in the chalcogenide glass is significantly greater than 2000 ppm, then the chalcogenide glass will not amplify optical signals in the 1.3 μm range as efficiently.

If the chalcogenide glass contains only two metals, it is described by the general formula $(X_a Z_{1-a})_c S_d$. In the formula X is one of the rare earth metals previously mentioned (e.g., La, Y, Lu, or Yb) and Z is a Group 3A metal as previously mentioned (e.g., Ga, Al, In). The specific compound $(La_a Ga_{1-a})_2 S_3$ is an example of a suitable glass.

As stated previously, the metal in the chalcogenide glass is at least about 10 mole percent rare earth metal, but is no more than about 50 mole percent of the total metal in the glass. Thus, "a" in the above formula is about 0.1 to about 0.5. Glasses that are about 30 mole percent rare earth metal are in the middle of this range. Therefore, glasses with about a 30 mole percent rare earth metal content are somewhat more stable. If the glass also contains other metals such as germanium (Ge), the above formula is modified to reflect the presence of these other metal constituents in the glass.

The mole ratio of metal to sulfur (c to d) in the glass is not precise. For example, in the above formula if c is about 2, d is about 2.5 to 3.5. Because of the nature of the glass formulation even when the mole ratio of glass to metal is specified, the ratio is not precise. For example, in the formula where the ratio of metal to sulfur is specified as 2 to 3, the mole ratio is about 2 to 3. One skilled in the art will recognize that the amounts of the materials in the glass are not subject to precise control.

The amounts of the various components used in the glass depend on the desired properties of the amplifier made from the glass. For example, the relative amounts of rare earth metal and other metals is varied within a particular range that is limited by two considerations. One consideration is the solubility of the rare earth metal in the molten glass. This limits the total amount of rare earth metal that can be physically incorporated into the glass. If no more than about 50 mole percent of the metal in the glass is rare earth metal, the rare earth metal typically mixes with the glass and does not separate into, a different phase.

The second consideration is the optical properties of the glass, which will be adversely affected if significant crystals form during glass formation. The presence of other metals such as the Group 3A metals increases the solubility of the rare earth metal in the molten glass. The presence of the Group 3A and other metals prevents significant crystal formation when the glass is prepared.

The glass is prepared in a number of ways. One way is by combining the metal sulfides in the amounts necessary to produce a glass with the desired amounts of the various metals. For example, to manufacture a glass with the general formula: $Pr^{3+}$: $(La_{0.3} Ga_{0.7})_2 S_3$, 10.09 g of lanthanum sulfide, 14.89 g of gallium sulfide and 0.017 g of praseodymium sulfide are combined.

It is advantageous if the sulfide metal reagents are heated in an $H_2S$ atmosphere to remove any oxides that might have formed after combining the metal sulfides to form the glass. The metal sulfides are then combined and heated to a temperature of about 1100° C. and maintained at that temperature for about 1 hour. The heated metal sulfides are then cooled below the glass transition temperature to form the glass.

An alternate way to prepare the rare earth metal-containing glass of the present invention is to obtain the rare earth and Group 3A metals in the oxide form and convert them to sulfides. For example, $Ga_2O_3$ is converted to $Ga_2S_3$ by heating the $Ga_2O_3$ to about 900° C. and holding the $Ga_2O_3$ at this temperature for 8 hours in the presence of flowing $H_2S$. Similarly, $La_2O_3$ is converted to $La_2S_3$ by heating the $La_2O_3$ to about 750° C., and holding it at that temperature for 4 hours in the presence of flowing $H_2S$. $Pr_2S_3$ is prepared from $PrCl_3$ by heating the $PrCl_3$ to 500° C. and holding it at that temperature for 4 hours in the presence of flowing $H_2S$. One skilled in the art will recognize that the temperatures enumerated above are subject to significant variation. The temperatures and times need only be sufficient to effect the desired conversion in the presence of $H_2S$. After the metals are converted to their sulfide form, the glass is prepared as described above.

A third way to prepare the glass of the present invention is to combine the metals in the appropriate mole ratio with sulfur and heat the combined elements to about 1000° C.

EXAMPLE 1

Preparation of a Rare Earth Metal-Containing Chalcogenide Glass.

$Ga_2O_3$ was placed in a crucible and converted to $Ga_2S_3$ by heating $Ga_2O_3$ to 900° C. and holding it at that temperature for 8 hours in the presence of flowing $H_2S$. $La_2O_3$ was placed in a crucible and converted to $La_2S_3$ by heating the $La_2O_3$ to 750° C. and holding it at that temperature for 4 hours in the presence of flowing $H_2S$. $Pr_2S_3$ was prepared from $PrCl_3$ by placing the $PrCl_3$ into a crucible and heating it to 500° C. The $PrCl_3$ was held at 500° C. for 4 hours in the presence of flowing $H_2S$. The raw materials were obtained from Cerac, Inc., which is located in Milwaukee, Wis.

The $La_2S_3$, (10.09 g), $Ga_2S_3$ (14.89 g), and $Pr_2S_3$ (0.017 g) were then weighed into a vitreous carbon container which was then sealed inside a silicon dioxide-lined tube furnace in a flowing argon atmosphere. The temperature of the furnace was then raised to about 1150° C. and maintained there for about 1 hour. The silica tube was then removed from the furnace and quenched. The sample was then annealed by placing the sample in an argon atmosphere and heating it to 550° C., holding it at this temperature for 6 hours and then cooling the sample at a rate of less than 0.1° C./min to room temperature to reduce stresses in the glass that were induced by the quench.

A glass was obtained that had a diameter of about 1.8 cm and a length of about 1.6 cm. Slices were cut and polished for optical and other measurements.

The fluorescence spectrum of $Pr^{3+}$: $(La_{0.3}Ga_{0.7})_2S_3$ in the vicinity of 1.3 μm, when excited with a Ti: sapphire laser at 1.017 μm, is illustrated in FIG. 1. The peak emission wavelength is 1.334 μm. The bandwidth is about 90 nm and the fluorescence intensity at 1.31 μm is only about 20 percent less than the fluorescence intensity at the peak emission wavelength.

Figure 2:
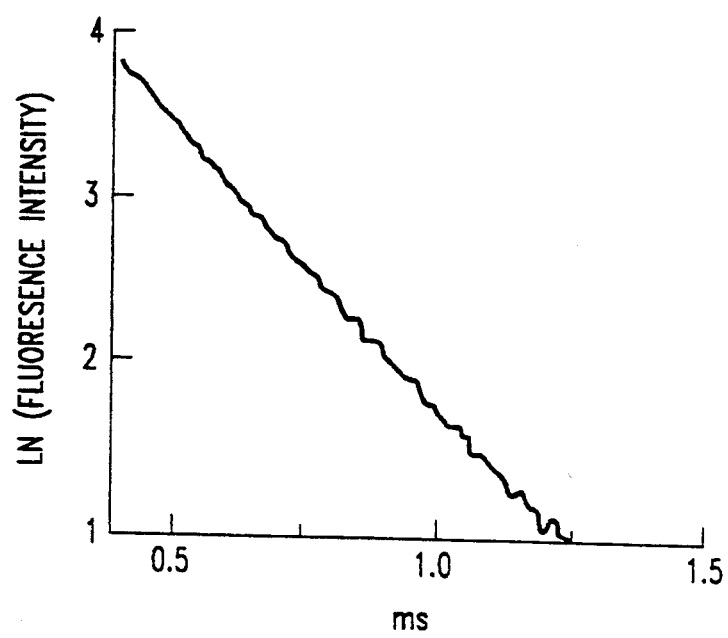
FIG. 2 illustrates the fluorescence decay of a praseodymium-doped La—Ga—S glass.

The lifetime of the $^1G_4$ level of the glass was measured by modulating the laser excitation and monitoring the fluorescence decay with a fast photodiode and a digitizing oscilloscope. The fluorescence decay at 1.33 μm is illustrated in FIG. 2. The decay is linear on a logarithmic scale, indicating a single lifetime of the $^1G_4$ level with a time constant of about 300 μs. Measurements of the lifetime as a function of concentration of $Pr^{3+}$ indicate that concentration quenching begins at the $8 \times 10^{18}$ cm$^{-3}$ level. This is approximately equal to a $Pr^{3+}$ concentration of 1000 ppm.

Amplifiers made of rare earth metal-containing chalcogenide glasses that are doped with praseodymium amplify optical signals in the 1.3 μm-band. ZBLAN glasses, when used as amplifiers for optical signals that have a wavelength of 1.31 μm, have low quantum efficiency of the 1.3 μm-band stimulated transmission. Therefore, high power pump lasers are required in order to use these materials in amplifiers intended to operate in the 1.3 μm region. The glass amplifiers of the present invention use less power to achieve the same degree of amplification as the ZBLAN glasses. Whereas, 400 mW of power is required for a gain of 30 dB in a ZBLAN glass, only about 100 mW of power is required to provide a gain of about 30 dB to about 40 dB in the glasses of the present invention.

The rare earth metal-containing chalcogenide glass exhibits more effective gain in the 1.3 μm band signal wavelength than ZBLAN glasses, which accounts for its more efficient operation. The highest prevalent phonon energy derived from the elemental vibrations in these glasses is about 200 to 300 cm$^{-1}$. By contrast, the highest prevalent phonon energy derived from the elemental vibrations in the ZBLAN glasses is about 500 cm$^{-1}$. A high phonon energy increases the probability of non-radiative decay. Non-radiative decay is undesirable, however, because it is energy dissipation that does not yield the desired discrete emission, which is 1.3 μm for $Pr^{3+}$. Because the rare earth metal-containing chalcogenide glass has a lower phonon energy than ZBLAN glasses, the probability of non-radiative decay in this glass is less than the probability on non-radiative decay in ZBLAN glasses. Thus, the rare earth-containing chalcogenide glass, with its lower prevalent phonon energy, exhibits more power efficient emission, and consequently, more efficient gain than ZBLAN glasses in the signal band of 1.3 μm.

The amplifier is made by processing the glass of the present invention into a fiber. The glass is processed generally by the techniques described in Izawa, T., and Sude, S., *Optical Fibers: Materials and Fabrication*, pp. 137-152 (1987), the teachings of which are incorporated by reference. The techniques for forming multi-component glasses into fiber are known to one skilled in the art.

The amplifier so processed has a cladding and a core. The core is made of the $Pr^{3+}$ doped, rare earth metal-containing glass previously described. Optionally, the cladding is made of a glass material that is similar to the core material, but the cladding is not doped with $Pr^{3+}$. One skilled in the art will recognize that there are many different ways to change the refractive index of the glasses disclosed herein. For example, the refractive index can be changed by adding an additional constituent or constituents, or varying the amount of a constituent or constituents. However, it is contemplated that the cladding material is also made of a glass material that has different constituents than the core glass material. The refractive index of the cladding material is different from the refractive index of the core material. In order for the amplifier to function as a waveguide, the refractive index of the cladding is less than the refractive index of the core.

The difference in refractive index between the cladding and the core materials is obtained by varying the amounts of the various components that make up the cladding and core materials. The difference in the indexes of refraction of the cladding and the core is typically at least about one percent. For example, assume the general formula of the cladding glass in the amplifier is $(La_{0.3}Ga_{0.7})_2S_3$. This material has a particular index of refraction, which, for the purposes of this illustration, is about 2.6 at 440 nm. The general formula for the core glass in the amplifier would be slightly different, $(La_{0.36}Ga_{0.64})_2S_3$, for example. This material has an index of refraction of about 2.67 at 440 nm. The composition of the cladding material and the composition of the core material are varied depending upon the amplifier properties that are desired and to ensure that the difference between the index of refraction of the cladding and the index of refraction of the core is significant. The effect of compositional differences in La—Ga—S glasses and the effect of these differences on the index of refraction of these glasses is discussed in Cervelle, B. D., et at., "Variation, Avec La Composition, Des Indices De Refraction Des Verres De Sulfureo De Lanthane Et De Gallium Et Indices De Quelques Verres Apparentes," *Mat. Res. Bull.*, 15:159–164 (1980), which is incorporated by reference into this disclosure.

The dimensions of the cladding and core are also varied depending upon the desired amplifier properties and the environment in which the amplifier is placed. Typically, the outside diameter of the amplifier cladding will be the same as the outside diameter of the optical fiber to which the amplifier will be attached. One example of a typical outer diameter is 125 μm.

The diameter of the amplifier core is also variable. Typical core diameters are less than 5 μm, and core diameter of 2 μm or less are contemplated. The length of the amplifier is typically determined after the glass is formed into a fiber and analyzed to determine its optical properties. Typically optical amplifiers are about 1 to about 40 meters in length. However, amplifiers of longer and shorter lengths are contemplated.

We claim:

1. A chalcogenide glass comprising: about 200 ppm to about 2000 ppm praseodymium, a second rare earth metal wherein the second rare earth metal is not praseodymium, at least one other metal that promotes glass formation and prevents the rare earth metals from separating from the molten phase during glass formation, and sulfur wherein the total rare metal content of the chalcogenid glass is at least 10 mole percent of the metals in the glass.

2. The glass of claim 1 wherein the second rare earth metal is selected from the group consisting of lanthanum, yttrium, ytterbium and lutetium.

3. The glass of claim 2, wherein the other metal is selected from the Group 3A metals of the Periodic Table.

4. The glass of claim 3 wherein the Group 3A metal is selected from the group consisting of gallium, aluminum and indium.

5. The glass of claim 4 wherein the Group 3A metal is gallium.

6. The glass of claim 4 wherein the glass further comprises a second other metal that prevents significant crystal formation when the glass is formed.

7. The glass of claim 6 wherein the second other metal is germanium.

8. The glass of claim 1 wherein the glass has a highest prevalent phonon energy derived from the elemental vibrations of the glass that is less than about 400 cm$^{-1}$.

9. The glass of claim 1 wherein the glass emits in 1.3 μm region.

* * * * *